US012038709B2

(12) United States Patent
Iwai

(10) Patent No.: US 12,038,709 B2
(45) Date of Patent: Jul. 16, 2024

(54) IMAGE FORMATION SYSTEM, SHEET CONVEYANCE SYSTEM, AND IMAGE FORMATION DEVICE

(71) Applicant: KONICA MINOLTA, INC., Tokyo (JP)

(72) Inventor: Katsutoshi Iwai, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 191 days.

(21) Appl. No.: 17/523,243

(22) Filed: Nov. 10, 2021

(65) Prior Publication Data

US 2022/0187750 A1 Jun. 16, 2022

(30) Foreign Application Priority Data

Dec. 11, 2020 (JP) ................................ 2020-205677

(51) Int. Cl.

| | |
|---|---|
| ***B41J 15/16*** | (2006.01) |
| ***B41J 15/00*** | (2006.01) |
| ***G03G 15/00*** | (2006.01) |
| ***G03G 21/20*** | (2006.01) |

(52) U.S. Cl.

CPC ........ *G03G 15/5029* (2013.01); *B41J 15/005* (2013.01); *B41J 15/16* (2013.01); *B41J 15/165* (2013.01); *G03G 15/70* (2013.01); *G03G 21/203* (2013.01); *G03G 15/6529* (2013.01)

(58) Field of Classification Search

CPC ........ B41J 15/005; B41J 15/16; B41J 15/165; G03G 15/5029; G03G 21/203; G03G 15/70; G03G 15/6529

See application file for complete search history.

(56) References Cited

U.S. PATENT DOCUMENTS

| | | | | |
|---|---|---|---|---|
| 8,920,051 B2 | 12/2014 | Shishido et al. | | |
| 2012/0199022 A1 | 8/2012 | Shishido et al. | | |
| 2013/0100223 A1* | 4/2013 | Sato | G03G 15/652 | 226/49 |
| 2015/0301491 A1* | 10/2015 | Yoshikawa | G03G 15/6564 | 271/3.2 |

(Continued)

FOREIGN PATENT DOCUMENTS

| | | |
|---|---|---|
| JP | 07-215554 A | 8/1995 |
| JP | 07215554 A * | 8/1995 |

(Continued)

OTHER PUBLICATIONS

First Office Action issued in corresponding Chinese Patent Application No. 202111474625.8, dated Apr. 26, 2023, with English Translation (18 pages).

(Continued)

*Primary Examiner* — Henok D Legesse

(74) *Attorney, Agent, or Firm* — BUCHANAN INGERSOLL & ROONEY PC

(57) ABSTRACT

An image formation system includes: an image former that forms an image on a continuous sheet; a slack generator that is arranged upstream of the image former in a sheet conveyance direction and generates slack on the continuous sheet; and a sheet characteristic detector that is arranged upstream of the slack generator in the sheet conveyance direction and detects a sheet characteristic of the continuous sheet.

16 Claims, 6 Drawing Sheets

(56) References Cited

U.S. PATENT DOCUMENTS

| | | | | |
|---|---|---|---|---|
| 2017/0160679 | A1* | 6/2017 | Sakurai .............. | G03G 15/1695 |
| 2017/0277098 | A1* | 9/2017 | Yamaoka ........... | G03G 15/6511 |
| 2022/0397846 | A1* | 12/2022 | Mitsuda ............. | G03G 15/5004 |

FOREIGN PATENT DOCUMENTS

| | | | |
|---|---|---|---|
| JP | 2012162032 | A | 8/2012 |
| JP | 2013-063821 | A | 4/2013 |
| JP | 2017138406 | A | 8/2017 |

OTHER PUBLICATIONS

Office Action (Notice of Reasons for Refusal) issued on Mar. 12, 2024, by the Japanese Patent Office in corresponding Japanese Patent Application No. 2020-205677, and an English Translation of the Office Action. (8 pages).

* cited by examiner

FIG. 6

| SHEET CHARACTERISTIC | USED SENSOR | REQUIRED DETECTION TIME | DETECTION TIME CONVEYANCE SPEED | REQUIRED SLACK AMOUNT |
| --- | --- | --- | --- | --- |
| SMOOTHNESS | REFLECTION OPTICAL SENSOR | 1.5 [SECONDS] | 0 [mm/SEC] | 150 [mm] |
| SURFACE RESISTANCE | CAPACITANCE SENSOR | 1.0 [SECOND] | 0 [mm/SEC] | 100 [mm] |
| PAPER THICKNESS | ULTRASONIC SENSOR | 1.0 [SECOND] | 20 [mm/SEC] | 80 [mm] |
| PAPER THICKNESS | ULTRASONIC SENSOR | 2.0 [SECONDS] | 20 [mm/SEC] | 160 [mm] |

IMAGE FORMATION SYSTEM, SHEET CONVEYANCE SYSTEM, AND IMAGE FORMATION DEVICE

The entire disclosure of Japanese patent Application No. 2020-205677, filed on Dec. 11, 2020, is incorporated herein by reference in its entirety.

BACKGROUND

Technological Field

The present invention relates to an image formation system, a sheet conveyance system, and an image formation device.

Description of the Related Art

A technology of detecting a characteristic of a sheet on which an image is to be formed by a sensor and correcting an image forming condition on the basis of a detection result is known. JP 2017-138406 A discloses a technology of stopping a sheet formed of cut paper at a sensor unit, and detecting the sheet characteristic by the sensor unit in this state.

However, in a case where the sheet on which the image is to be formed is a continuous sheet, it has not been possible to detect the sheet characteristic for the following reasons.

Since the continuous sheet is continuously conveyed in a sheet conveyance direction, when the conveyance of the continuous sheet is stopped in order to detect the sheet characteristic, the sheet conveyance is also stopped in an image former and a fixing unit. Therefore, for example, in a thermocompression bonding type fixing unit, there is a possibility that a sheet or an image is excessively heated and damaged when the sheet conveyance is stopped. Therefore, in order to avoid damage on the sheet and the like, it is required to continue the sheet conveyance, and as a result, it has not been possible to detect the sheet characteristic of the continuous sheet.

SUMMARY

The present invention is achieved to solve the above-described problems, and an object thereof is to provide an image formation system, a sheet conveyance system, and an image formation device capable of detecting a sheet characteristic even in a case where a sheet on which an image is to be formed is a continuous sheet.

To achieve the abovementioned object, according to an aspect of the present invention, an image formation system reflecting one aspect of the present invention comprises: an image former that forms an image on a continuous sheet; a slack generator that is arranged upstream of the image former in a sheet conveyance direction and generates slack on the continuous sheet; and a sheet characteristic detector that is arranged upstream of the slack generator in the sheet conveyance direction and detects a sheet characteristic of the continuous sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram illustrating an example of a result of calculating a predetermined amount of slack.

DETAILED DESCRIPTION OF EMBODIMENTS

Figure 1:
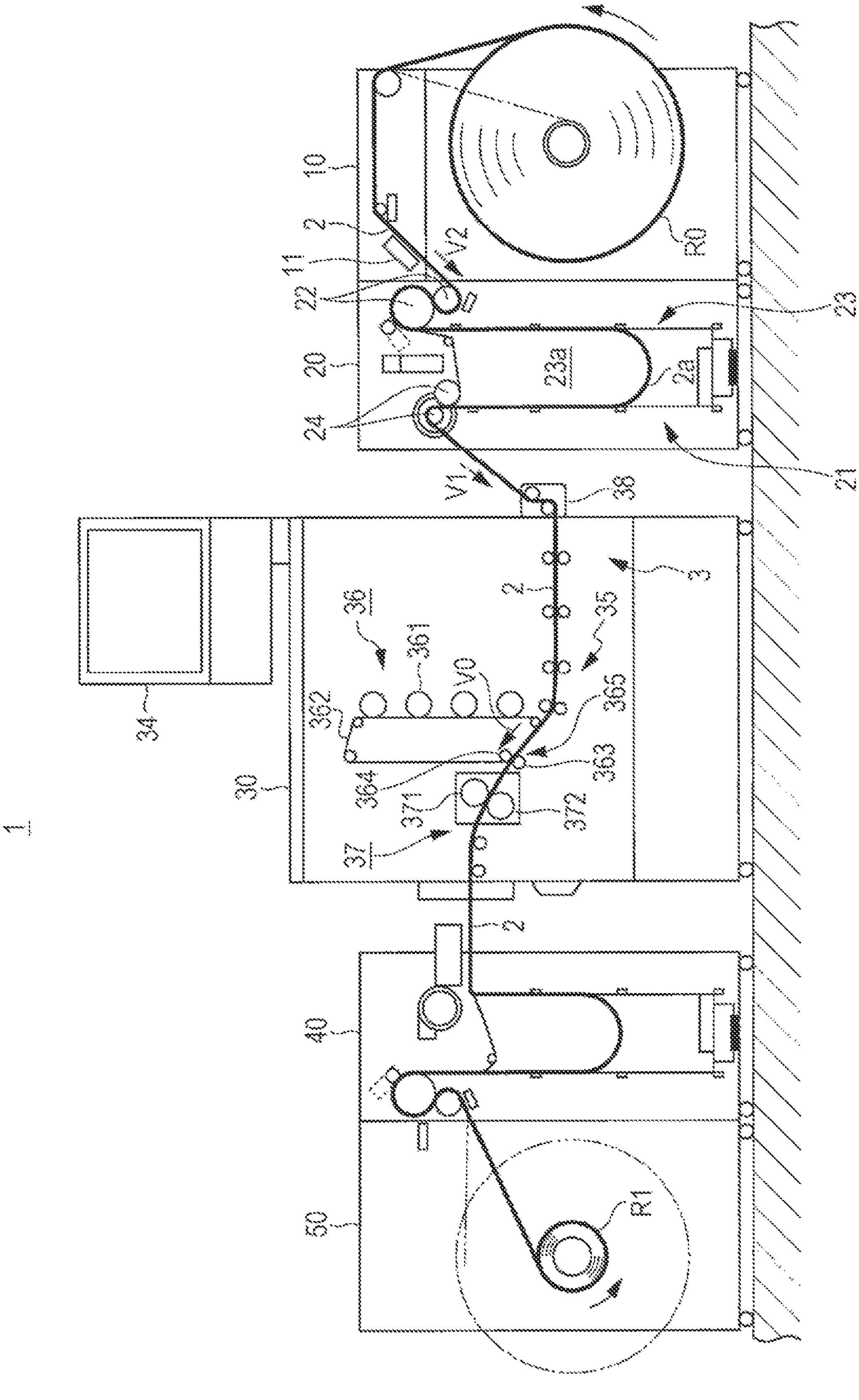
FIG. 1 is a schematic diagram illustrating a configuration example of an image formation system according to an embodiment of the present invention.

Hereinafter, one or more embodiments of the present invention will be described with reference to the drawings. However, the scope of the invention is not limited to the disclosed embodiments. In this specification and the drawings, elements having substantially the same function or configuration are assigned with the same reference numeral, and the description thereof is not repeated.

FIG. 1 is a schematic diagram illustrating a configuration example of an image formation system according to the embodiment of the present invention. FIG. 1 illustrates a case as seen from a standing position side of a user who uses (operates) the image formation system.

An image formation system 1 according to the embodiment of the present invention handles a continuous sheet as a target of image formation. In this embodiment, roll paper is described as an example of the continuous sheet. However, the continuous sheet is not limited to the roll paper, and may be, for example, a sheet in an alternately folded form (in Z shape). A material of the continuous sheet is not limited to paper, and may be, for example, a resin film, cloth and the like. The continuous sheet may be a label sheet formed by adhering a label to which an adhesive is applied to release paper.

As illustrated in FIG. 1, the image formation system 1 is provided with a sheet supply device 10, a slack generation device 20, an image formation device 30, a sheet discharge adjustment device 40, and a sheet winding device 50. A continuous sheet 2 is conveyed from the sheet supply device 10 to the sheet winding device 50 via the slack generation device 20, the image formation device 30, and the sheet discharge adjustment device 40.

The sheet supply device 10 accommodates and holds roll paper R0 as the continuous sheet 2 wound into a roll. The sheet supply device 10 serves as a sheet supplier that supplies the continuous sheet 2 to an image former 36. The sheet supply device 10 supplies the continuous sheet 2 to the slack generation device 20 and the image formation device 30. Inside the sheet supply device 10, the roll paper R0 rotates in an arrow direction (counterclockwise direction in FIG. 1) when the continuous sheet 2 is supplied.

The sheet supply device 10 is provided with a sheet characteristic detector 11. The sheet characteristic detector 11 is arranged upstream of a slack generator 21 included in the slack generation device 20 in a sheet conveyance direction. The sheet characteristic detector 11 detects a sheet characteristic of the continuous sheet 2. Examples of the sheet characteristic detected by the sheet characteristic detector 11 may include, for example, a paper type, smoothness, glossiness, water content, basis weight, paper thickness (sheet thickness), surface resistance, rigidity, density, air permeability and the like of the roll paper as the continuous sheet 2. The sheet characteristic detector 11 is provided with a plurality of sensors according to the sheet characteristic to be detected. This type of sensors is also referred to as media sensors. In this embodiment, as an example, the sheet characteristic detector 11 is provided with a reflective optical sensor that detects the smoothness, a capacitance sensor that detects the surface resistance, and an ultrasonic sensor that detects the paper thickness.

The slack generation device 20 is arranged downstream of the sheet supply device 10 in the sheet conveyance direction. The slack generation device 20 is arranged upstream of the image formation device 30 in the sheet conveyance direction. The slack generation device 20 is provided with the slack generator 21 that generates slack on the continuous sheet 2. The slack generator 21 is provided with a pre-stage conveyance roller 22, a slack accommodation unit 23, and a post-stage conveyance roller 24. The pre-stage conveyance roller 22 and the post-stage conveyance roller 24 are arranged side by side in the sheet conveyance direction. The slack generator 21 generates the slack using a rotational speed difference (conveyance speed difference) between the pre-stage conveyance roller 22 and the post-stage conveyance roller 24.

The pre-stage conveyance roller 22 is a roller that conveys the continuous sheet 2 supplied from the sheet supply device 10. The slack accommodation unit 23 accommodates the slack of the continuous sheet 2 generated by the slack generator 1. The slack accommodation unit 23 is configured such that an accommodation space 23*a* is formed between the pre-stage conveyance roller 22 and the slack accommodation unit 23, and a slack portion 2*a* of the continuous sheet 2 is accommodated in the accommodation space 23*a*. The post-stage conveyance roller 24 is a roller that conveys the continuous sheet 2 toward the image formation device 30.

A conveyance speed V1 of the continuous sheet 2 by the post-stage conveyance roller 24 corresponds to a first speed. The conveyance speed V1 is controlled to be a speed suitable for forming an image on the continuous sheet 2 by the image former 36. In contrast, a conveyance speed V2 of the continuous sheet 2 by the pre-stage conveyance roller 22 corresponds to a second speed. In a detection position of the sheet characteristic detector 11, the continuous sheet 2 is conveyed in accordance with rotation of the pre-stage conveyance roller 22. Therefore, the conveyance speed V2 becomes the same speed as the conveyance speed of the continuous sheet 2 in the detection position of the sheet characteristic detector 11.

Both the conveyance speed V1 and the conveyance speed V2 may be changed. Specifically, in a case where a drive source that rotates the post-stage conveyance roller 24 is a stepping motor, the conveyance speed V1 may be changed by changing a cycle of a pulse signal input to a driver of the stepping motor. Similarly, in a case where a drive source that rotates the pre-stage conveyance roller 22 is a stepping motor, the conveyance speed V2 may be changed by changing a cycle of a pulse signal input to a driver of the stepping motor. The drive source of the pre-stage conveyance roller 22 and the drive source of the post-stage conveyance roller 24 are individually controlled by a controller 31 to be described later.

The conveyance speed V1 is set in accordance with an image forming condition applied when the image is formed on the continuous sheet 2, and this is controlled to be a constant speed once the image forming condition is set unless the image forming condition is changed (corrected and the like). In contrast, the conveyance speed V2 is controlled to be the same speed as the conveyance speed V1 in a case where the continuous sheet 2 is conveyed without slack between the pre-stage conveyance roller 22 and the post-stage conveyance roller 24. The conveyance speed V2 is controlled to be higher than the conveyance speed V1 in a case where the slack is generated on the continuous sheet 2 between the pre-stage conveyance roller 22 and the post-stage conveyance roller 24.

A slack amount of the continuous sheet 2 in the slack generator 21 is defined as follows by a length of the continuous sheet 2 in the sheet conveyance direction.

First, in a case where no slack is generated on the continuous sheet 2 between the pre-stage conveyance roller 22 and the post-stage conveyance roller 24, that is, in a case where the slack amount is 0, the length of the continuous sheet 2 present between the pre-stage conveyance roller 22 and the post-stage conveyance roller 24 is set to L1 (mm). In a case where the slack is generated on the continuous sheet 2 between the pre-stage conveyance roller 22 and the post-stage conveyance roller 24, the length of the continuous sheet 2 present between the pre-stage conveyance roller 22 and the post-stage conveyance roller 24 is set to L2 (mm). In such a case, a difference between the length L2 and the length L1 corresponds to the slack amount of the continuous sheet 2.

The image formation device 30 forms an image based on image data on the continuous sheet 2 by an electrophotographic process that is a well-known image forming process. The image formation device 30 is described later in detail.

The sheet discharge adjustment device 40 is arranged between the image formation device 30 and the sheet winding device 50 in the sheet conveyance direction. The sheet discharge adjustment device 40 adjusts the supply of the continuous sheet 2 discharged from the image formation device 30 to the sheet winding device 50. Specifically, the sheet discharge adjustment device 40 has a buffer function of absorbing a minute conveyance speed difference of the continuous sheet 2 between the image formation device 30 and the sheet winding device 50. The sheet discharge adjustment device 40 is provided as necessary.

The sheet winding device 50 receives the continuous sheet 2 discharged from the image formation device 30 via the sheet discharge adjustment device 40, and winds the received continuous sheet 2 into a roll shape to form roll paper R1.

Next, the image formation device 30 is described in detail.

The image formation device 30 is provided with an operation panel 34, a sheet conveyance unit 35, an image former 36, and a fixing unit 37. Respective components of the image formation device 30 are connected to each other via a bus for exchanging signals. The same applies to components of a control system of the image formation system 1 to be described later.

The operation panel 34 serves as an operation unit that receives various input operations and a display unit that displays various types of information. The operation panel 34 is formed of, for example, a touch panel in which a touch sensor as the operation unit is superimposed on the display unit formed of a liquid crystal display (LCD), an organic electro luminescence (EL) display or the like. In addition to the touch panel, the operation unit is provided with a numeric keypad, a start button, a stop button and the like. Note that, an example in which the display unit and the operation unit are integrally formed is described in this embodiment, but the present invention is not limited thereto. The operation unit formed of a button, a key and the like, and the display unit formed of an LCD and the like may be separately configured.

The sheet conveyance unit 35 conveys the continuous sheet 2 along a sheet conveyance path formed in the image formation device 30. The sheet conveyance unit 35 is provided with a plurality of conveyance rollers arranged at predetermined intervals on the sheet conveyance path described above, and a conveyance motor (not illustrated) that is a drive source for rotating the conveyance rollers.

The image former 36 forms the image based on the image data on the continuous sheet 2 conveyed by the sheet conveyance unit 35. The image former 36 is provided with four image forming units 361 corresponding to respective colors of yellow, magenta, cyan, and black, an intermediate transfer belt 362, a transfer roller 363, and a counter roller 364.

Each of the image forming units 361 is provided with a photoreceptor drum that is an image carrier, and a neutralizer, a charger, a developer, a primary transfer unit, a drum cleaner and the like arranged around the photoreceptor drum. Each image forming unit 361 forms a toner image on a surface of the photoreceptor drum using toner of each color. The intermediate transfer belt 362 is formed of an endless belt. The intermediate transfer belt 362 is supported in a loop shape by a plurality of rollers. The toner image formed by the image forming unit 361 is transferred from the photoreceptor drum to the intermediate transfer belt 362. Transfer at this stage is referred to as primary transfer.

The transfer roller 363 and the counter roller 364 are rollers that rotate with the intermediate transfer belt 362 interposed therebetween. The transfer roller 363 and the counter roller 364 are opposed (close) to each other via the intermediate transfer belt 362, and form a transfer nip portion 365 in this opposed portion. The counter roller 364 transfers the toner image conveyed by the intermediate transfer belt 362 to the continuous sheet 2 in the transfer nip portion 365. Transfer at this stage is referred to as secondary transfer.

The fixing unit 37 is provided with a fixing roller 371 and a pressure roller 372. The fixing unit 37 fixes the image on the continuous sheet 2 by heating and pressurizing the continuous sheet 2 on which the image (toner image) is formed by the image former 36. The fixing roller 371 is heated by a heater (not illustrated) arranged inside, a heating roller (not illustrated) arranged outside and the like. The pressure roller 372 forms a fixing nip portion between the same and the opposed fixing roller 371, and heats and pressurizes the continuous sheet 2 that passes through the fixing nip portion.

A roller pair including the transfer roller 363 and the counter roller 364 described above and a roller pair including the fixing roller 371 and the pressure roller 372 described above also serve as conveyance rollers that convey the continuous sheet 2 by rotating with a motor (not illustrated) as a drive source. That is, the sheet conveyance unit 35 includes the roller pair including the transfer roller 363 and the counter roller 364, and the roller pair including the fixing roller 371 and the pressure roller 372 described above.

Figure 2:
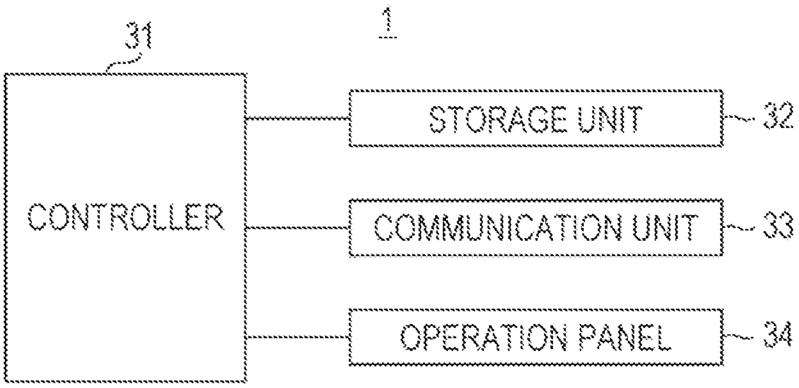
FIG. 2 is a block diagram illustrating a configuration example of a control system of the image formation system according to the embodiment of the present invention.

FIG. 2 is a block diagram illustrating a configuration example of the control system of the image formation system according to the embodiment of the present invention.

As illustrated in FIG. 2, the image formation system 1 is provided with the controller 31, a storage unit 32, a communication unit 33, and the operation panel 34. The operation panel 34 is as described above. The controller 31, the storage unit 32, and the communication unit 33 are provided in the image formation device 30, for example.

The controller 31 is provided with a central processing unit (CPU), a read only memory (ROM), and a random access memory (RAM) as hardware resources of a computer. The CPU reads a predetermined program from the ROM, develops the same in the RAM, and comprehensively controls an entire operation of the image formation system 1 according to the developed program.

For example, the controller 31 controls the conveyance of the continuous sheet 2 by operating the sheet supply device 10, the slack generation device 20, the image formation device 30, the sheet discharge adjustment device 40, and the sheet winding device 50 described above in cooperation with each other. The image formation system 1 is provided with a sheet conveyance route 3 including the above-described sheet conveyance unit 35. The sheet conveyance route 3 is formed of a plurality of conveyance rollers arranged at appropriate intervals on the sheet conveyance path from the sheet supply device 10 to the sheet winding device 10, and a plurality of conveyance guide members that guides the conveyance of the continuous sheet 2 conveyed by each conveyance roller. The conveyance rollers forming the sheet conveyance route 3 include the pre-stage conveyance roller 22 and the post-stage conveyance roller 24 described above.

The controller 31 corrects the image forming condition in the image former 36 on the basis of the sheet characteristic of the continuous sheet 2 detected by the sheet characteristic detector 11. Detection data of the sheet characteristic detected by the sheet characteristic detector 11 is provided from the sheet characteristic detector 11 to the controller 31. The image forming condition corrected on the basis of the sheet characteristic includes at least one of a condition that affects a quality of the image formed on the continuous sheet 2 and a condition that affects a finishing state of the continuous sheet 2.

A program for allowing a computer of the image formation system 1 to serve as the controller 31 is recorded in a computer-readable recording medium to be provided. Examples of the recording medium may include a portable recording medium such as a hard disk drive (HDD), a USB memory, a CD-ROM, and a DVD disk, for example. Program data may also be provided by transmission and reception via the Internet and the like.

The storage unit 32 stores various data required for controlling the operation of the image formation system 1, for example, print data such as the image data, job setting values, various detection values, reference values and the like. The storage unit 32 is formed of, for example, a hard disk drive (HDD), a solid state drive (SSD) and the like in addition to the RAM.

The communication unit 33 is communicably connected to an external device (for example, a personal computer and the like) via a communication network not illustrated, and exchanges various data with the external device. The communication network is, for example, a local area network (LAN), a wide area network (WAN) and the like. For example, the controller 31 receives a page description language (PDL) transmitted from the external device, and controls operations of the image former 36, the fixing unit 37 and the like on the basis of the image data included in the PDL, thereby forming the image on the continuous sheet 2.

Figure 3:
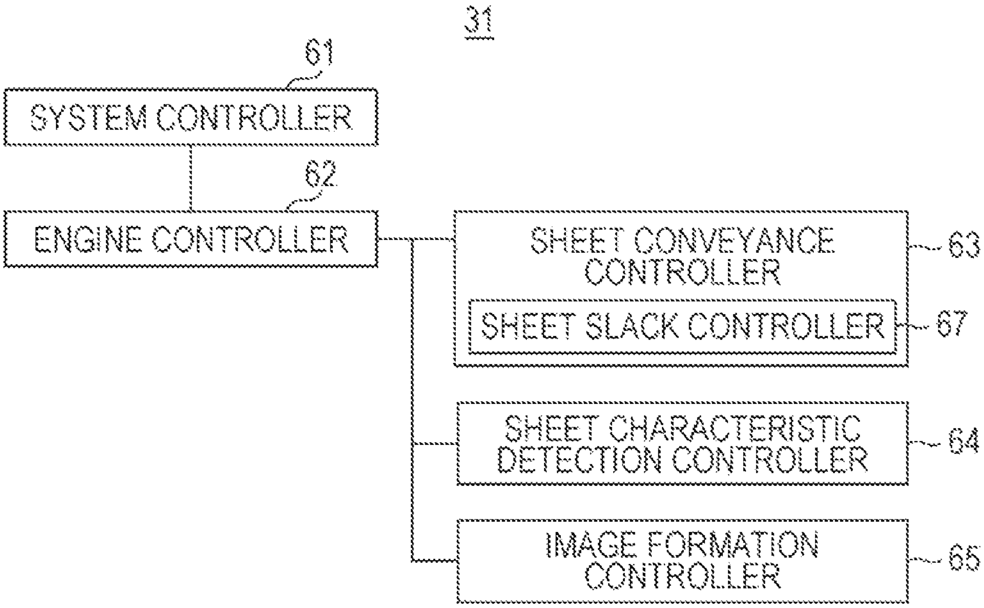
FIG. 3 is a block diagram illustrating an example of an internal configuration of a controller illustrated in FIG. 2.

FIG. 3 is a block diagram illustrating an example of an internal configuration of the controller illustrated in FIG. 2.

As illustrated in FIG. 3, the controller 31 is provided with a system controller 61, an engine controller 62, a sheet conveyance controller 63, a sheet characteristic detection controller 64, and an image formation controller 65.

The system controller 61 receives a print instruction from the operation panel 34 or the external device, and provides a control instruction to the engine controller 62 on the basis of the received print instruction. There is a case where the print instruction is received from a user who operates the operation panel 34 or received from a user who operates the external device. The system controller 61 performs image processing on the image data included in the print instruction. Examples of the image processing may include image correction processing, drawing processing, compression processing, color correction processing, region extraction, color space conversion processing, binarization processing and the like.

The engine controller 62 controls an engine of each device (10, 20, 30, 40, and 50) included in the image formation system 1. The engine is a mechanical mechanism. The engine controller 62 controls the engine of each device in accordance with the control instruction provided from the system controller 61. The sheet conveyance controller 63, the sheet characteristic detection controller 64, and the image formation controller 65 are connected to the engine controller 62.

The sheet conveyance controller 63 controls a sheet conveyance operation. The sheet conveyance controller 63 includes a sheet slack controller 67. The sheet slack controller 67 controls an operation of the slack generator 21 in the slack generation device 20. The operation of the slack generator 21 is a rotation operation of the pre-stage conveyance roller 22 and the post-stage conveyance roller 24. The sheet characteristic detection controller 64 controls an operation of the sheet characteristic detector 11. The operation of the sheet characteristic detector 11 is an operation of detecting the sheet characteristic of the continuous sheet 2 using the media sensor. The image formation controller 65 controls the operation of the image former 36 and the operation of the fixing unit 37.

Figure 4:
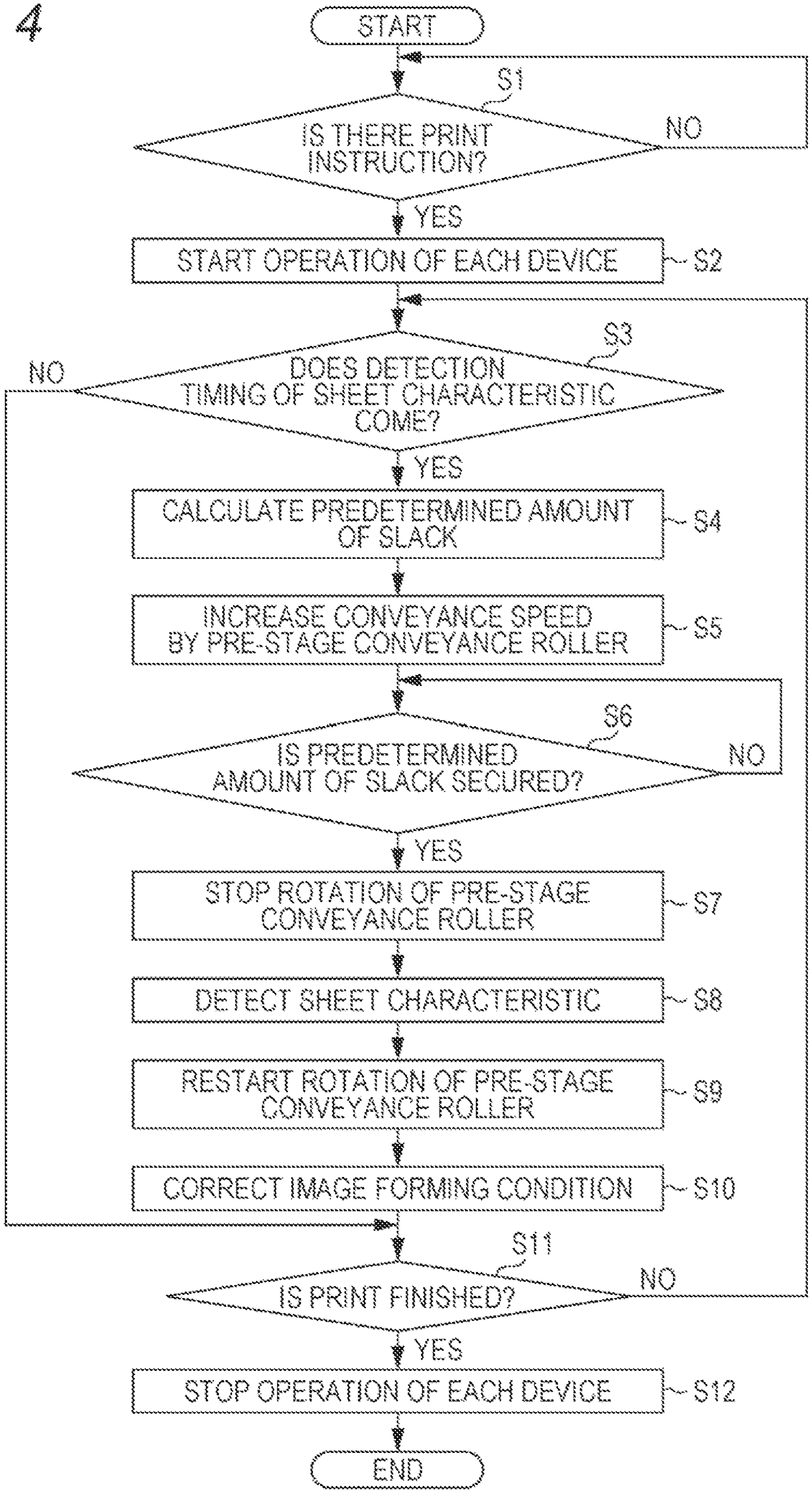
FIG. 4 is a flowchart illustrating a processing procedure of the image formation system according to the embodiment of the present invention.

FIG. 4 is a flowchart illustrating a processing procedure of the image formation system according to the embodiment of the present invention.

First, the system controller 61 repeatedly confirms whether there is the print instruction (step S1). When receiving the print instruction from the operation panel 34 or the external device, the system controller 61 determines YES at step S1, and provides the control instruction to the engine controller 62 on the basis of the received print instruction.

Figure 5:
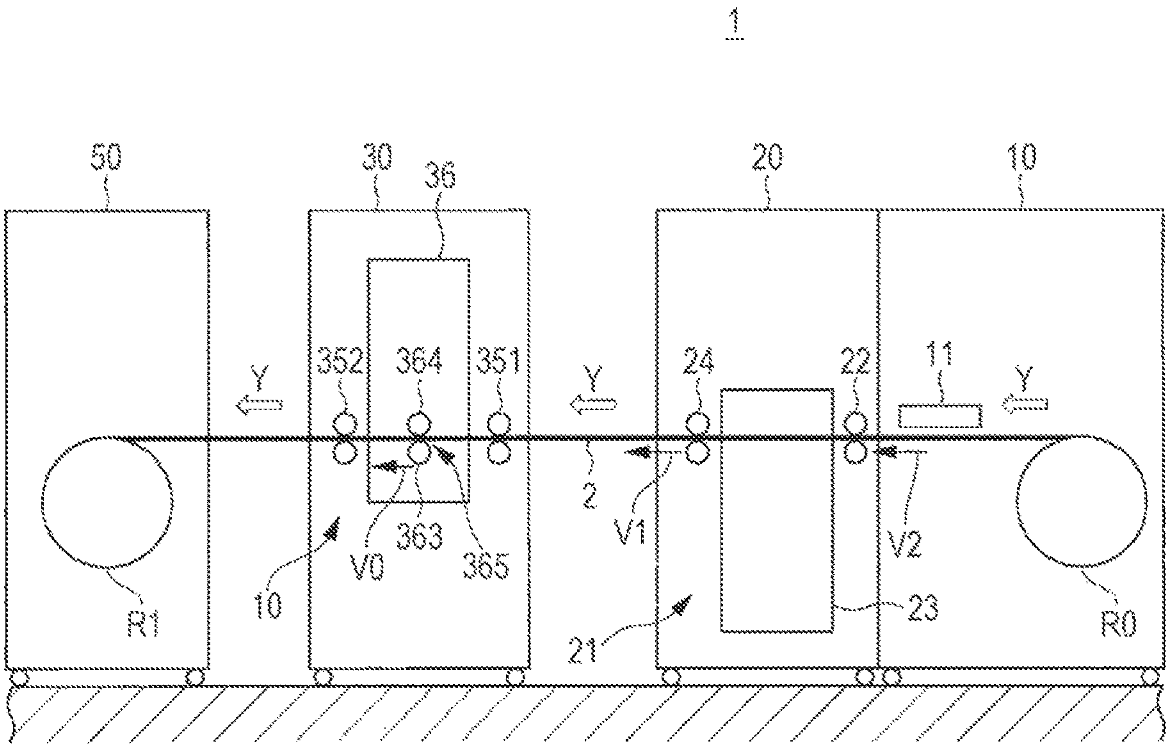
FIG. 5 is a schematic diagram illustrating a state in which an image is formed on a continuous sheet without slack on a continuous sheet.

Next, the engine controller 62 starts the operation of each device by controlling the engine of each device (10, 20, 30, 40, and 50) in accordance with the control instruction described above (step S2). As a result, the image formation system 1 operates as follows. First, as illustrated in FIG. 5, the sheet supply device 10 conveys the continuous sheet 2 in a Y direction from the sheet supply device 10 toward the sheet winding device 50. The Y direction indicates the sheet conveyance direction. Note that, in FIG. 5, the sheet discharge adjustment device 40 is not illustrated.

The image is formed on (transferred to) the continuous sheet 2 conveyed in the sheet conveyance direction Yin the transfer nip portion 365 of the image former 36. In FIG. 5, a conveyance roller 351 arranged upstream of the image former 36 and a conveyance roller 352 arranged downstream of the image former 36 convey the continuous sheet 2 at a conveyance speed V0. The conveyance speed V0 is the conveyance speed applied when the image is formed on the continuous sheet 2.

In contrast, in the slack generation device 20, the pre-stage conveyance roller 22 and the post-stage conveyance roller 24 convey the continuous sheet 2 at the same conveyance speed. That is, a relationship between the conveyance speed V1 by the post-stage conveyance roller 24 and the conveyance speed V2 by the pre-stage conveyance roller 22 is V1=V2. A relationship between the conveyance speed V1 by the post-stage conveyance roller 24 and the conveyance speed V0 by the above-described conveyance rollers 351 and 352 is V1=V0. The conveyance speeds V0, V2, and V3 are maintained at constant speeds. As a result, the continuous sheet 2 is conveyed at a constant speed without slack on the sheet conveyance path from the pre-stage conveyance roller 22 to the conveyance roller 352.

In a case where the image that should be formed on the continuous sheet 2 is, for example, a label image, and the label images are printed side by side without any space on the continuous sheet 2 (hereinafter, this is also referred to as "label printing"), the label images are continuously transferred to the continuous sheet 2 in the transfer nip portion 365 of the image former 36. Note that the image formed on the continuous sheet 2 may be an image other than the label image. The continuous sheet 2 on which the image is already formed is transmitted to the sheet winding device 50 via the sheet discharge adjustment device 40 not illustrated, where this is wound into the roll shape to form the roll paper R1.

It is described with reference to the flowchart in FIG. 4 again. At step S3, the sheet characteristic detection controller 64 determines whether a detection timing of the sheet characteristic comes. When the sheet characteristic detection controller 64 determines that the detection timing of the sheet characteristic comes, the procedure shifts to step S4, and when this determines that the detection timing of the sheet characteristic does not come, the procedure shifts to step S11. It is determined whether the detection timing of the sheet characteristic comes on the basis of, for example, at least any one of an image formation operation time, the number of formed images, and an environmental change. Hereinafter, this is specifically described.

The image formation operation time is an elapsed time from when the operation of each device is started at step S2. The image formation operation time may be measured by, for example, a timer function of the controller 31. When the time being measured by the timer function reaches a reference time set in advance, the sheet characteristic detection controller 64 determines that the detection timing of the sheet characteristic comes.

The number of formed images is the number of images formed on the continuous sheet 2. The number of formed images may be counted by, for example, a counter function of the controller 31. When the number of formed images being counted by the counter function reaches a reference number set in advance, the sheet characteristic detection controller 64 determines that the detection timing of the sheet characteristic comes.

The environmental change is a change in environment in which the image formation system 1 is installed. Examples of the environment include temperature, humidity and the like, for example. The temperature may be measured by a temperature sensor included in the image formation device 30. The humidity may be measured by a humidity sensor included in the image formation device 30. The sheet characteristic detection controller 64 monitors how much the temperature being measured by the temperature sensor changes after step S2 described above, and determines that the detection timing of the sheet characteristic comes when the temperature change becomes equal to or larger than a temperature change reference amount set in advance. The sheet characteristic detection controller 64 monitors how much the humidity being measured by the humidity sensor changes after step S2 described above, and determines that the detection timing of the sheet characteristic comes when the humidity change becomes equal to or larger than a humidity change reference amount set in advance.

Note that a parameter for determining whether the detection timing of the sheet characteristic comes is not limited to the image formation operation time, the number of formed images, and the environmental change described above, and other parameters may also be adopted. The reference time, the reference number, the temperature change reference amount, and the humidity change reference amount described above may be stored in the storage unit 32.

Subsequently, at step S4, the sheet slack controller 67 calculates a predetermined amount of slack required for detecting the sheet characteristic (hereinafter, also referred to as a "required slack amount"). Hereinafter, a method of calculating the predetermined amount of slack is described.

The predetermined amount of slack is determined on the basis of the conveyance speed of the continuous sheet 2 on which the image formation is being executed by the image former 36 and a detection time required for the sheet characteristic detector 11 to detect the sheet characteristic. The conveyance speed of the continuous sheet 2 on which the image formation is being executed is the conveyance speed V0 by the conveyance rollers 351 and 352 described above. The conveyance speed V0 is the same as the conveyance speed V1 by the post-stage conveyance roller 24. In contrast, the detection time required for the sheet characteristic detector 11 to detect the sheet characteristic is determined on the basis of the sensor used according to the sheet characteristic to be detected by the sheet characteristic detector 11.

Herein, for example, in a case where the conveyance speed V0 of the continuous sheet 2 on which the image formation is being executed is 100 (mm/sec), a detection time T required for the sheet characteristic detector 11 to detect the smoothness of the continuous sheet 2 is 1.0 (second), and the continuous sheet 2 needs to be stopped at the sheet characteristic detector 11 by this detection time, a required slack amount S is calculated to be 100 (mm) on the basis of following equation (1).

$$S\ (\text{mm}) = V\mathbf{0}\ (\text{mm}) \times T\ (\text{seconds}) \quad (1)$$

FIG. 6 is a diagram illustrating an example of a result of calculating the predetermined amount of slack.

As illustrated in FIG. 6, the sheet characteristic detectable by the sheet characteristic detector 11 includes the smoothness, the surface resistance, and the paper thickness. In the sheet characteristic detector 11, the sensor used to detect the smoothness is the reflective optical sensor, the sensor used to detect the surface resistance is the capacitance sensor, and the sensor used to detect the paper thickness is the ultrasonic sensor. The detection time required for detecting the smoothness is 1.5 (seconds), and the detection time required for detecting the surface resistance is 1.0 (second). In contrast, the detection time required for detecting the paper thickness varies according to a detection mode applied to the sheet characteristic detector 11. Specifically, the detection mode applied to the detection of the paper thickness includes a normal mode and a high accuracy mode. The high accuracy mode is the mode in which the paper thickness is detected with higher accuracy than that in the normal mode. The detection time required for detecting the paper thickness in the normal mode is 1.0 (second), and the detection time required for detecting the paper thickness in the high accuracy mode is 2.0 (seconds). In other words, the required detection time is determined on the basis of the detection mode applied to the sheet characteristic detector 11. Note that, in this embodiment, the detection mode (normal mode and high accuracy mode) applied to the detection of the paper thickness is described as an example of the detection mode applied to the sheet characteristic detector 11, but the detection time required for the detection of the sheet characteristic may be determined on the basis of other detection modes.

With reference to FIG. 5 again, a detection time conveyance speed is a sheet conveyance speed applied when the sheet characteristic detector 11 detects the sheet characteristic of the continuous sheet 2. The detection time conveyance speed is set in advance for each sheet characteristic detectable by the sheet characteristic detector 11. Specifically, the sheet conveyance speed applied when the smoothness is detected is set to 0 (mm/sec), and the sheet conveyance speed applied when the surface resistance is detected is also set to 0 (mm/sec). The sheet conveyance speed applied when the paper thickness is detected is set to 20 (mm/sec) regardless of a difference in the detection mode (normal mode and high accuracy mode) described above.

The required slack amount is calculated as follows for each sheet characteristic in a case where the conveyance speed of the continuous sheet 2 in the image former 36 is 100 (mm/sec). As illustrated in FIG. 6, regarding the smoothness, since the required detection time is 1.5 (seconds) and the detection time conveyance speed is 0 (mm/sec), the required slack amount is calculated to be 150 (mm). Regarding the surface resistance, since the required detection time is 1.0 (second) and the detection time conveyance speed is 0 (mm/sec), the required slack amount is calculated to be 100 (mm). In contrast, regarding the paper thickness, in a case where the detection mode is the normal mode, the required detection time is 1.0 (second) and the detection time conveyance speed is 20 (mm/sec), so that the required slack amount is calculated to be 80 (mm), and in a case where the detection mode is the high accuracy mode, the required detection time is 2.0 (seconds) and the detection time conveyance speed is 20 (mm/sec), so that the required slack amount is calculated to be 160 (mm)

The sheet slack controller 67 may correct the required slack amount calculated as described above by at least one of the sheet information and the environmental information. The sheet information is the information regarding a physical property of the continuous sheet 2, and includes, for example, at least one of the rigidity and the paper type. The environmental information is the information regarding an installation environment of the image formation system 1, and includes, for example, at least one of the temperature and the humidity. The sheet slack controller 67 corrects the calculated required slack amount by, for example, +5% according to the sheet information and the environmental information. As a result, when the calculated required slack amount is 100 (mm), the required slack amount after the correction according to the sheet information and the environmental information is 105 (mm). Note that, a correction amount of the required slack amount may be arbitrarily changed. The correction amount of the required slack amount may be manually set by the user using the operation panel 34 or the external device. In this manner, by correcting the required slack amount on the basis of the sheet information and the environmental information, even in a case where a time from when the sheet conveyance by the pre-stage conveyance roller 22 is stopped until a physical slip or vibration is settled varies depending on the paper type, the humidity and the like, the sheet characteristic may be detected in a state in which the continuous sheet 2 is stabilized in the sheet characteristic detector 11.

Herein, in a case where the smoothness, the surface resistance, and the paper thickness of the continuous sheet 2 are simultaneously detected in parallel using the sensors corresponding thereto in the sheet characteristic detector 11, the sheet slack controller 67 adopts a maximum required slack amount (150 (mm) in the example in FIG. 5) among the required slack amounts calculated as described above as a calculation result. In a case where the smoothness, the surface resistance, and the paper thickness of the continuous sheet 2 are sequentially detected using the sensors corresponding thereto in the sheet characteristic detector 11, the sheet slack controller 67 adopts a total amount of the required slack amounts calculated as described above as the calculation result. Incidentally, in a case where the detection mode of the paper thickness is the normal mode, a total value of the required slack amounts is 330 (mm), and in a case where the detection mode of the paper thickness is the high accuracy mode, the total value of the required slack amounts is 410 (mm).

In this embodiment, as an example, the surface resistance of the continuous sheet 2 is detected. As illustrated in FIG. 5 above, the detection time required for detecting the surface resistance of the continuous sheet 2 is 1.0 (second), the detection time conveyance speed is 0 (mm/sec), and the required slack amount is 100 (mm).

Figure 7:
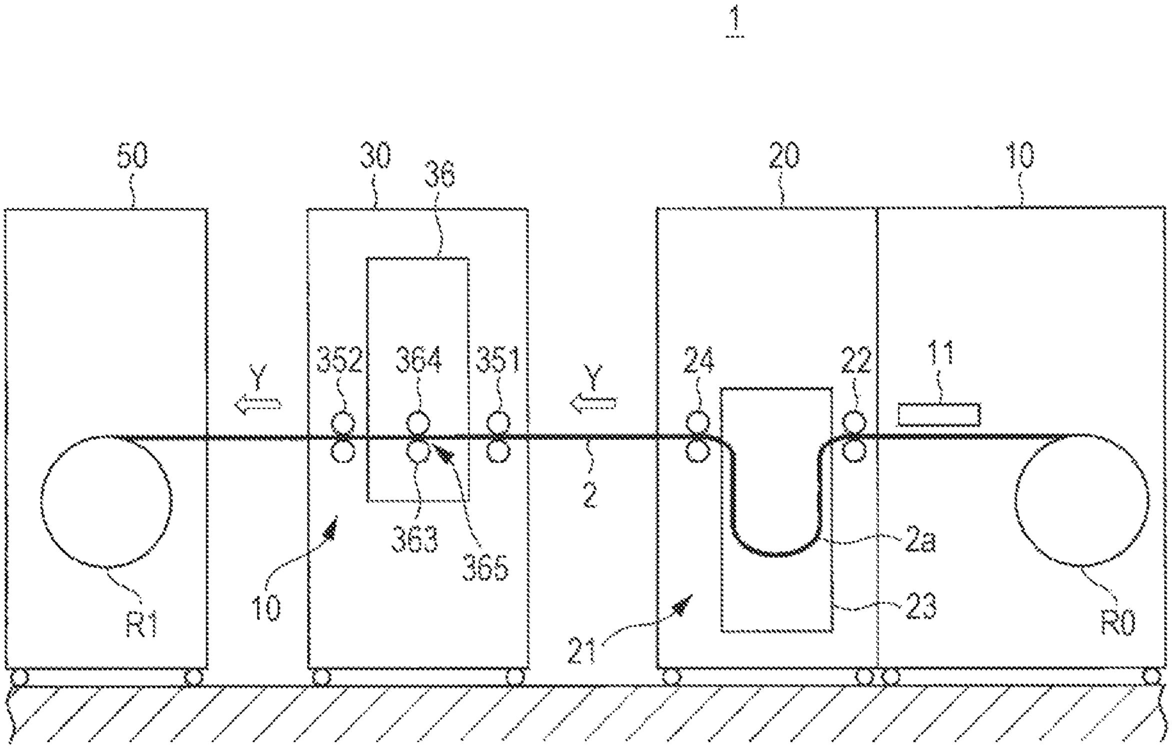
FIG. 7 is a schematic diagram illustrating a state in which the image is formed on the continuous sheet with slack on the continuous sheet.

With reference to FIG. 4 again, at step S5, the sheet slack controller 67 increases the conveyance speed V2 of the continuous sheet 2 by the pre-stage conveyance roller 22. Before the conveyance speed V2 is increased, the conveyance speeds V0, V2, and V3 are maintained at the same speed, but after the conveyance speed V2 is increased, a relationship among the conveyance speeds V0, V2, and V3 is V0=V1 and V1<V2. As a result, as illustrated in FIG. 7, the slack is generated on the continuous sheet 2 between the pre-stage conveyance roller 22 and the post-stage conveyance roller 24. Reference sign 2*a* in FIG. 7 represents the slack portion of the continuous sheet 2. In FIG. 7, the sheet discharge adjustment device 40 is not illustrated.

Next, at step S6, the sheet slack controller 67 determines whether the predetermined amount of slack is secured between the pre-stage conveyance roller 22 and the post-stage conveyance roller 24. The slack amount of the continuous sheet 2 between the pre-stage conveyance roller 22 and the post-stage conveyance roller 24 may be detected by calculation and the like on the basis of an elapsed time from when the conveyance speed V2 starts to be increased and the conveyance speed difference (V2−V1). The slack amount of the continuous sheet 2 may also be measured using a sensor, a camera and the like not illustrated.

In a case where the conveyance speed V2 is increased from 100 (mm/sec) to 200 (mm/sec) at step S5, the predetermined amount (100 mm in this example) of slack may be secured by increasing the conveyance speed V2 to 200 (mm/sec) only for one second on calculation. However, in practice, it is required to consider a time required for acceleration, a slip generated between the continuous sheet 2 and the pre-stage conveyance roller 22 and the like.

Thereafter, when determining that the predetermined amount of slack is secured at step S6 described above, the sheet slack controller 67 stops the rotation of the pre-stage conveyance roller 22 (step S7). That is, the sheet slack controller 67 controls the conveyance speed V2 of the continuous sheet 2 in the sheet characteristic detector 11 to be lower than the conveyance speed V0 of the continuous sheet 2 in the image former 36 in a state in which the slack is generated on the continuous sheet 2 by the slack generator 21. A state in which the conveyance speed V2 is lower than the conveyance speed V0 includes both a state in which the conveyance speed V2 is 0 (mm/sec) and a state in which this is higher than 0 (mm/sec). In this embodiment, in order to stop the rotation of the pre-stage conveyance roller 22, the conveyance speed V2 by the pre-stage conveyance roller 22 is 0 (mm/sec), that is, the continuous sheet 2 is stopped. Therefore, the conveyance speed of the continuous sheet 2 in the sheet characteristic detector 11 is also 0 (mm/sec), that is, the continuous sheet 2 stops in the detection position of the sheet characteristic detector 11. Note that, when the rotation of the pre-stage conveyance roller 22 stops, the rotation of the roll paper R0 also stops. Therefore, the generation of the slack of the continuous sheet 2 in the detection position of the sheet characteristic detector 11 is suppressed.

Next, the sheet characteristic detection controller 64 allows the sheet characteristic detector 11 to detect the sheet characteristic of the continuous sheet 2 (step S8). Since the processing at steps S5 to S7 described above is performed before the processing at step S8, the slack generator 21 generates the predetermined amount of slack before the sheet characteristic detector 11 detects the sheet characteristic. In a case where the surface resistance of the continuous sheet 2 is detected at step S8, the sheet characteristic detector 11 detects the surface resistance of the continuous sheet 2 using the capacitance sensor in accordance with a control instruction provided from the sheet characteristic detection controller 64 to the sheet characteristic detector 11. The surface resistance is detected for the detection time of 1.0 second, and a detection result is provided from the sheet characteristic detector 11 to the image formation controller 65. While the sheet characteristic detector 11 detects the surface resistance of the continuous sheet 2 in this manner, the post-stage conveyance roller 24 continuously conveys the continuous sheet 2 toward the image former 36 at the conveyance speed V1. Therefore, the slack portion 2*a* (refer to FIG. 7) of the continuous sheet 2 generated by the slack generator 21 at steps S5 to S7 described above gradually decreases while the sheet characteristic (surface resistance in this example) is being detected.

When the detection of the sheet characteristic is finished, the sheet slack controller 67 restarts the rotation of the pre-stage conveyance roller 22 (step S9). In other words, the sheet slack controller 67 recovers the conveyance speed of the continuous sheet 2 in the sheet characteristic detector 11 after finishing the detection of the sheet characteristic. At that time, the sheet slack controller 67 restarts the rotation of the pre-stage conveyance roller 22 before the slack of the continuous sheet 2 disappears. The sheet slack controller 67 sets the conveyance speed V2 by the pre-stage conveyance roller 22 to the same speed as the conveyance speed V1 by the post-stage conveyance roller 24. As a result, the state returns to the state illustrated in FIG. 5. The sheet conveyance controller 63 controls the rotation of a plurality of conveyance rollers including the post-stage conveyance roller 24 and the conveyance rollers 351 and 352 such that the conveyance speed V0 of the continuous sheet 2 in the image former 36 is maintained constant from before the sheet characteristic detector 11 detects the sheet characteristic of the continuous sheet 2 to after the detection.

Next, the image formation controller 65 corrects the image forming condition on the basis of the sheet characteristic of the continuous sheet 2 provided from the sheet characteristic detector 11 (step S10). As the image forming condition to be corrected, for example, various conditions such as a charged voltage and a toner supply amount in the image forming unit 361, a fixing pressure and fixing temperature in the fixing unit 37 or the like may be considered. The image formation controller 65 applies the corrected image forming condition to an image to be formed first after the sheet characteristic detector 11 completes the detection of the sheet characteristic. The "image to be formed" herein described refers to an image formed on the photoreceptor by irradiation with a laser beam in the electrophotographic process. The image formation controller 65 applies the corrected image forming condition to an image to be formed after the sheet position where the sheet characteristic detector 11 detects the sheet characteristic. "After the sheet position" herein described includes the sheet position where the sheet characteristic detector 11 detects the sheet characteristic and the sheet position upstream of this sheet position in the sheet conveyance direction.

In this manner, by setting the image to which the corrected image forming condition is applied, it is possible to form the image in accordance with the corrected image forming condition in the position of the continuous sheet 2 where the sheet characteristic is detected by the sheet characteristic detector 11. Therefore, a quality of the image formed on the continuous sheet 2 may be improved.

Next, the engine controller 62 determines whether printing on the basis of the print instruction received at step S1 described above is finished (step S11). In a case of determining that the printing is not finished, the engine controller 62 returns to the processing at step S3 described above, and when determining that the printing is finished, this stops the operation of each device (10, 20, 40, and 50) (step S12).

Note that, in this embodiment, the case where the surface resistance of the continuous sheet 2 is detected by the sheet characteristic detector 11 is described as an example; however, in a case where the smoothness of the continuous sheet 2 is detected, the processing procedure is basically similar except that a period (time) in which the conveyance speed V2 by the pre-stage conveyance roller 22 is increased in order to secure the predetermined amount of slack and a time in which the rotation of the pre-stage conveyance roller 22 is stopped for sheet detection are different. In contrast, in a case where the sheet characteristic detector 11 detects the paper thickness of the continuous sheet 2, the sheet slack controller 67 decreases the conveyance speed V2 by the pre-stage conveyance roller 22 from 100 (mm/sec) to 20 (mm/sec) at step S7 described above. Then, the sheet slack controller 67 allows the continuous sheet 2 to pass through the detection position of the sheet characteristic detector 11 at the conveyance speed of 20 (mm/sec), and the sheet characteristic detection controller 64 controls the sheet characteristic detector 11 to detect the paper thickness of the continuous sheet 2 that is passing using the ultrasonic sensor.

<Effect of Embodiment>

The embodiment of the present invention adopts a configuration in which the slack generator 21 is arranged upstream of the image former 36 in the sheet conveyance direction, and the sheet characteristic detector 11 is arranged upstream of the slack generator 21 in the sheet conveyance direction. As a result, a difference between the conveyance speed V0 of the continuous sheet 2 in the image former 36 and the conveyance speed V2 of the continuous sheet 2 in the sheet characteristic detector 11 may be absorbed by the slack of the continuous sheet 2 generated by the slack generator 21. Therefore, also in a case where the sheet on which the image is to be formed is the continuous sheet 2, the sheet characteristic detector 11 may detect the sheet characteristic of the continuous sheet 2.

In the embodiment of the present invention, in a case where the sheet characteristic is detected by the sheet characteristic detector 11, it is controlled such that the slack generator 21 generates the slack on the continuous sheet 2, and the sheet characteristic detector 11 detects the sheet characteristic of the continuous sheet 2 while the slack portion 2*a* (refer to FIG. 7) is conveyed toward the image former 36. As a result, it is possible to detect the sheet characteristic without adversely affecting the image formation.

In the embodiment of the present invention, it is controlled such that the conveyance speed V2 of the continuous sheet in the sheet characteristic detector 11 becomes lower than the conveyance speed V0 of the continuous sheet 2 in the image former 36 in a state in which the slack is generated on the continuous sheet 2 by the slack generator 21. As a result, it becomes possible to set the conveyance speed V2 to a speed suitable for detecting the sheet characteristic while maintaining the conveyance speed V0 at a speed suitable for the image formation. Therefore, it is possible to improve detection accuracy of the sheet characteristic without adversely affecting the image formation. The image former 36 may continuously convey the continuous sheet 2 at the conveyance speed V0. Therefore, in a case of performing the label printing on the continuous sheet 2, it becomes possible to detect the sheet characteristic without generating a gap between the label images adjacent to each other in the sheet conveyance direction. In a case of printing while securing a prescribed amount of gap between the label images adjacent to each other in the sheet conveyance direction, it is possible to detect the sheet characteristic without generating the gap exceeding the prescribed amount between the label images. When an extra gap is generated between the label images, in a case where roll width cutting, die cutting and the like is performed in post-processing after the image formation, the post-processing cannot be appropriately performed due to relative positional displacement of the label images due to the extra gap; however, in this embodiment, there is no possibility that such inconvenience occurs.

<Variation and the Like>

The technical scope of the present invention is not limited to the above-described embodiment, and includes a mode in which various changes and modifications are added within a scope in which specific effects obtained by the constituent features of the invention and the combination thereof may be derived.

For example, in the above-described embodiment, the sheet characteristic detector 11 is provided in the sheet supply device 10, and the slack generator 21 is provided in the slack generation device 20, but the present invention is not limited thereto, and for example, the sheet characteristic detector 11 and the slack generator 21 may be provided in the image formation device 30. In a case where the sheet characteristic detector 11 is provided in the image formation device 30, the slack generator 21 may be arranged upstream of the transfer nip portion 365 in the image former 36 in the sheet conveyance direction, and the sheet characteristic detector 11 may be arranged upstream of the slack generator 21 in the sheet conveyance direction.

In a case where a sheet supply adjustment device (not illustrated) that absorbs a minute conveyance speed difference of the continuous sheet 2 is provided between the sheet supply device 10 and the image formation device 30, the slack generation device 20 may be formed by using this sheet supply adjustment device.

The image formation system that forms the image on the continuous sheet by the electrophotographic process is described as an example in the above-described embodiment, but the present invention is not limited thereto, and may be applied to the image formation system that forms the image on the continuous sheet by another image forming process, for example, an inkjet process.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image formation system comprising:

an image former that forms an image on a continuous sheet;

a slack generator that is arranged upstream of the image former in a sheet conveyance direction and generates slack on the continuous sheet;

a sheet characteristic detector that is arranged upstream of the slack generator in the sheet conveyance direction and detects a sheet characteristic of the continuous sheet; and a hardware processor that allows the slack generator to generate the slack on the continuous sheet, and controls the sheet characteristic detector to detect the sheet characteristic of the continuous sheet while a slack portion generated on the continuous sheet is conveyed toward the image former, wherein the hardware processor controls the slack generator to generate a predetermined amount of slack before the sheet characteristic detector detects the sheet characteristic.

2. The image formation system according to claim 1, wherein the hardware processor controls a conveyance speed of the continuous sheet in the sheet characteristic detector to be lower than a conveyance speed of the continuous sheet in the image former in a state in which the slack generator generates the slack on the continuous sheet.

3. The image formation system according to claim 1, wherein the hardware processor allows the continuous sheet to pass through a detection position of the sheet characteristic detector at a second speed lower than the first speed while the slack portion is conveyed to the image former at the first speed, and controls the sheet characteristic detector to detect the sheet characteristic of the continuous sheet that is passing.

4. The image formation system according to claim 1, wherein the hardware processor stops the continuous sheet in the detection position of the sheet characteristic detector while the slack portion is conveyed to the image former at a first speed, and controls the sheet characteristic detector to detect the sheet characteristic of the continuous sheet that is stopping.

5. The image formation system according to claim 1, wherein the hardware processor controls a conveyance speed of the continuous sheet in the image former to be maintained constant from before the sheet characteristic detector detects the sheet characteristic of the continuous sheet after the detection.

6. The image formation system according to claim 1, wherein the predetermined amount of slack is determined on the basis of a conveyance speed of the continuous sheet on which image formation is being executed by the image former, and a detection time required for the sheet characteristic detector to detect the sheet characteristic.

7. The image formation system according to claim 6, wherein the required detection time is determined on the basis of a sensor used according to the sheet characteristic to be detected by the sheet characteristic detector.

8. The image formation system according to claim 6, wherein the required detection time is determined on the basis of a detection mode applied to the sheet characteristic detector.

9. The image formation system according to claim 1, wherein the predetermined amount of slack is corrected by sheet information.

10. The image formation system according to claim 9, wherein the sheet information includes at least one of rigidity and a paper type.

11. The image formation system according to claim 1, wherein the predetermined amount of slack is corrected by environmental information.

12. The image formation system according to claim 11, wherein the environmental information includes at least one of temperature and humidity.

13. The image formation system according to claim 1, wherein the hardware processor corrects an image forming condition in the image former on the basis of the sheet characteristic detected by the sheet characteristic detector, and applies a corrected image forming condition to an image to be formed first after the sheet characteristic detector completes detection of the sheet characteristic.

14. The image formation system according to claim 1, wherein the hardware processor corrects an image forming condition in the image former on the basis of the sheet characteristic detected by the sheet characteristic detector, and applies a corrected image forming condition to an image formed after a sheet position where the sheet characteristic detector detects the sheet characteristic.

15. A sheet conveyance system comprising:

a sheet supplier that supplies a continuous sheet to an image former that forms an image on a continuous sheet;

a slack generator that is arranged upstream of the image former in a sheet conveyance direction on a sheet conveyance route on which the continuous sheet supplied from the sheet supplier is conveyed and generates slack on the continuous sheet;

a sheet characteristic detector that is arranged upstream of the slack generator in the sheet conveyance direction on the sheet conveyance route and detects a sheet characteristic of the continuous sheet; and a hardware processor that allows the slack generator to generate the slack on the continuous sheet, and controls the sheet characteristic detector to detect the sheet characteristic of the continuous sheet while a slack portion generated on the continuous sheet is conveyed toward the image former, wherein the hardware processor controls the slack generator to generate a predetermined amount of slack before the sheet characteristic detector detects the sheet characteristic.

16. An image formation device comprising:

an image former that forms an image on a continuous sheet; and a hardware processor that controls a slack generator that is arranged upstream of the image former in a sheet conveyance direction and generates slack on the continuous sheet, and a sheet characteristic detector that is arranged upstream of the slack generator in the sheet conveyance direction and detects a sheet characteristic of the continuous sheet, wherein the hardware processor allows the slack generator to generate the slack on the continuous sheet, and controls the sheet characteristic detector to detect the sheet characteristic of the continuous sheet while a slack portion generated on the continuous sheet is conveyed toward the image former, and the hardware processor controls the slack generator to generate a predetermined amount of slack before the sheet characteristic detector detects the sheet characteristic.

* * * * *